United States Patent [19]

Collonia

[11] Patent Number: 4,638,879
[45] Date of Patent: Jan. 27, 1987

[54] DEVICE FOR REGULATING THE SPEED OF A VEHICLE, PARTICULARLY AN AUTOMOTIVE VEHICLE, HAVING AN ELECTRONIC REGULATOR

[75] Inventor: Harald Collonia, Glasshütten, Fed. Rep. of Germany

[73] Assignee: VDO Adolf Schindling AG, Frankfurt am Main, Fed. Rep. of Germany

[21] Appl. No.: 701,606

[22] Filed: Feb. 14, 1985

[30] Foreign Application Priority Data

Feb. 17, 1984 [DE] Fed. Rep. of Germany ....... 3405707

[51] Int. Cl.$^4$ .............................................. B60K 31/04
[52] U.S. Cl. .................................... 180/179; 123/352; 318/305
[58] Field of Search ............... 180/176, 177, 178, 179; 123/350, 352, 360, 361; 318/305, 311, 312; 364/426, 565

[56] References Cited

U.S. PATENT DOCUMENTS 4,402,376 9/1983 Hagashi et al. ..................... 364/426

*Primary Examiner*—John J. Love
*Assistant Examiner*—Richard Lamby
*Attorney, Agent, or Firm*—Martin A. Farber

[57] ABSTRACT

In a device for regulating the speed of a vehicle, particularly an automotive vehicle, having an electronic regulator, at least one first storage for the storing of a first speed desired-value signal as well as a control arrangement for the storage are provided. In the regulator, a speed actual-value signal is compared with the speed desired-value signal and a corresponding setting signal is produced which actuates a setting member (13). There is also connected to the regulator an operating device (16) which comprises at least one button (19 or 20) for setting the storage to the speed desired-value signal, one button (17) for disconnecting the regulation as well as a restart button (18) for reactivating the regulation. Within the regulator there is provided a second storage (5) for storing a second speed desired-value signal which forms a so-called stack together with the first storage (4). The stack of the two storages can be so controlled by the control arrangement (16) that at suitable times the first or the second speed desired-value signal can be set in the first storage and in this way the previously stored speed desired-value signal can also be used for the regulation at a desired later point in time.

4 Claims, 1 Drawing Figure

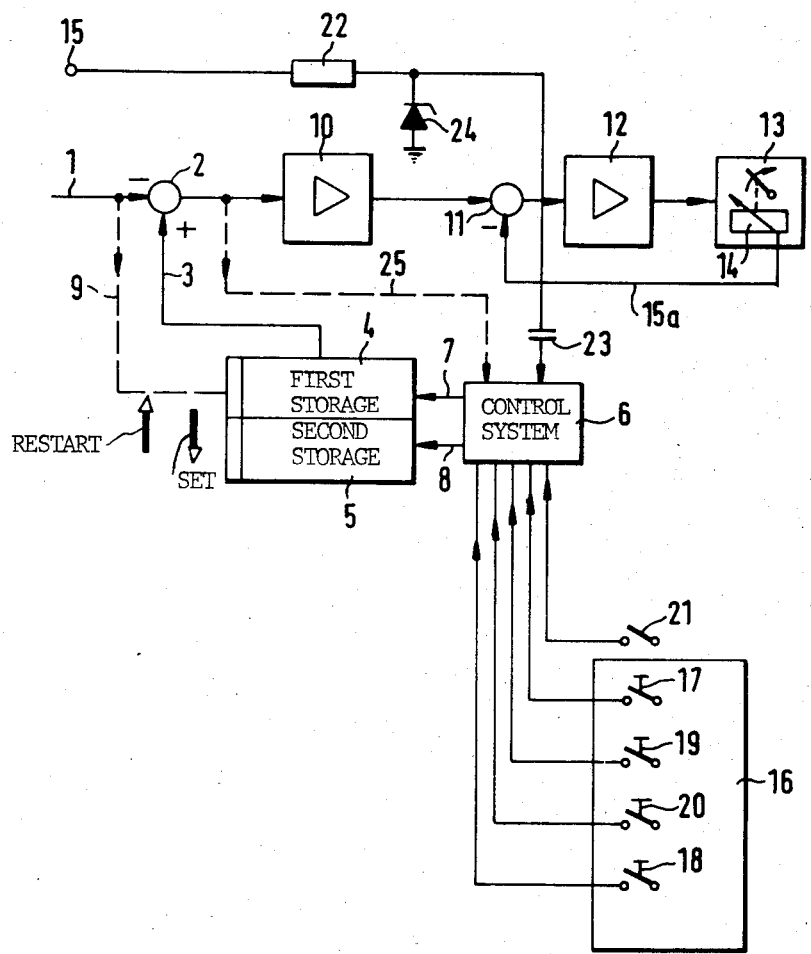

DEVICE FOR REGULATING THE SPEED OF A VEHICLE, PARTICULARLY AN AUTOMOTIVE VEHICLE, HAVING AN ELECTRONIC REGULATOR

BACKGROUND OF THE INVENTION

The invention relates to a device for regulating the speed of a vehicle and particularly of an automotive vehicle, having an electronic regulator which has at least one first storage for storing a first speed desired-value signal as well as a control arrangement for the storage and in which a speed actual-value signal is compared with the speed desired-value signal and a corresponding setting signal is produced, and having an operating device which is connected to the regulator and has at least one button for setting the storage to the speed desired-value signal, one button for disconnecting the regulation, and a restart button for reactivating the regulation.

In one such known device, the regulator or the storage corresponding to it is set by actuating the button for setting the speed desired-value signal which corresponds to the actual speed at the time of the actuation of the button. The operating of the speed-regulated vehicle can be facilitated furthermore in the manner that, by the actuating of a button for setting an acceleration, the vehicle is accelerated until the button is released, the speed reached being fed at the same time as speed desired-value signal into the one storage. By means of a further button for setting a deceleration, the vehicle can be decelerated in a similar manner as long as this button is actuated, and upon the release of this button there is stored in the same storage a desired-value signal which corresponds to the speed reached by deceleration at this time. After the setting of the regulator or storage, the vehicle travels with the regulated speed until either a button for the disconnecting of the regulation is actuated on the operating device or the vehicle is decelerated by the vehicle brake, which also is reported as electric signal in the regulator. The vehicle can then be automatically accelerated again to a desired speed equal to the previously set speed desired-value signal by simply actuating the restart button. In this way, the previously stored speed desired-value signal for the regulation is activated. Therefore, in known devices for regulating the speed of a vehicle there is merely the possibility of bringing the actual-value of the speed automatically to the one desired value set if the speed is not intentionally continuously determined in conventional manner by the driver - actuation of the gas pedal and actuation of the brake. In actual driving, however, it may happen that the driver would initially like to drive on the open road with a given relatively high regulated cruising speed. If during the course of this travel there is encountered a section over which a maximum permitted speed prevails, as for instance in the exits and entrances of superhighways, hills or construction sites, then the regulated speed must be disconnected and the vehicle braked. The said section is then traveled over at the permitted lower speed. This can be done in the manner that by actuating the gas pedal the driver maintains this speed while observing his tachometer, which, however, is uncomfortable in the case of long sections of road. To be sure, with this procedure the stored speed desired-value for the cruising speed is maintained so that the cruising speed can be reached by actuating the restart button. If the maintaining of the reduced speed by observation of the tachometer and corresponding actuation of the gas pedal, which is uncomfortable over lengthier sections of road on which the maximum permitted speed is reduced, is to be avoided, the storage in the regulator can be set to this reduced speed as speed desired-value. In this case, however, the speed desired-value for the cruising speed is lost. Therefore, in such a case, after the end of the reduced-speed section has been reached, the regulator must be again set to the speed desired value signal corresponding to the cruising speed. This method of setting is relatively uncomfortable since the tachometer must be observed until the end of the setting process until the vehicle has accelerated to the desired speed. Furthermore, as a result of this, the attention of the driver may be diverted from the road.

It is therefore an object of the present invention to develop a device for regulating the speed of a vehicle and particularly of an automotive vehicle having an electronic regulator in such a manner that not only is the cruising speed regulated but, in addition, a second speed—as a rule a lower speed in the case of a limitation in the permitted speed of travel—can be automatically set without time-consuming setting processes.

SUMMARY OF THE INVENTION

According to the invention, a second storage (5) for storing a second speed desired-value signal is provided in the regulator, this second storage being connected with the first storage (4) in a stack (4, 5) which can be controlled by the control arrangement (6).

In accordance with the invention, not only can a first speed desired-value signal corresponding to the cruising speed be stored and activated for automatic regulation of the speed of the vehicle, but, in addition, a second speed desired-value signal can be set in the regulator and activated without wiping out the first speed desired-value signal. In this way it is possible, in particular in a convenient and safety-promoting manner, at the end of the reduced-speed zone which has been traveled over with the automatically regulated reduced speed value—second speed desired-value—to switch back, by actuating the restart button, to the first speed desired-value, which permits the vehicle to accelerate again to cruising speed and maintain this speed constant. The means provided for this consist not only of a second storage but in arranging the first and second storages in a stack and controlling the latter by the control arrangement.

By such a structure of the control arrangement (6) that in each case upon each actuation of the setting button (19 or 20) the existing speed signal can be stored in the first storage (4) as speed desired-value signal after a speed desired-value signal which may have been previously stored in the first storage has been transferred into the second storage (5), and that by actuating the restart button (18) the speed desired-value signal contained in the second storage (5) can be transferred into the first storage (4) for the regulation, one of the two speed desired-values can always be reset in the first storage at little switching expense. In this connection, the speed desired value which is contained in the second storage will not be erased. If one desires to pass from the newly set speed desired-value to the previous speed desired-value it is sufficient to actuate the restart button in convenient manner. For example, a speed desired-value corresponding to a reduced speed can be stored in the first storage at the beginning of the corresponding reduced-speed zone while the speed desired value of the cruising speed remains in the second storage. After the reduced speed zone has been passed with limited regulated speed, the speed desired-value of the cruising speed can again be transferred into the first storage by actuating the restart button.

Upon the last-mentioned process, in the case of the further embodiment of the device, the speed desired-value signal is particularly suitably duplicated in the second storage by actuation of the restart button (18), particularly as it is transferred by actuation of the restart button from the second storage into the first storage. In this way, the first speed desired-value signal, corresponding for instance to the cruising speed, is then also again in the second storage. The speed of the vehicle, for instance the cruising speed, can therefore not be changed by mistake by repeated actuation of the restart button.

For this, there is also advantageously utilized the further feature that means are provided for storing the same present speed desired-value signal in the first storage (4) and in the second storage (5) upon the first actuation of the setting button (19 or 20) after the connecting of the ignition (terminal 15).

In this way it is avoided that upon actuation of the restart button--which can also be effected by mistake---no usable speed desired-value signal is transferred from the second storage into the first storage of the stack arrangement.

By a structure of the control arrangement (6) which is further developed in such a manner that, after actuation of the switch button (17) and upon actuation of the restart button (18) the speed desired-value signal last present in the first storage is activated for the regulation and no speed desired-value signal can be transferred between the first storage (4) and the second storage (5), assurance is had that, upon interrupting of the automatic regulation of the vehicle speed with the second speed desired-value signal by actuating the button for disconnecting the regulation or by applying the vehicle brake and upon subsequently reconnecting the regulation by means of the restart button, the speed regulation takes place at the tempo corresponding to the second speed desired-value signal. The first speed desired-value signal which determines the cruising speed will not enter into action in this case, not even upon repeated actuation of the restart button. The first speed desired-value signal can be effectively turned on by actuating the restart button only after the speed of the vehicle has been regulated to a speed actual value which is equal to the second speed desired value. In this way, detrimental effects of erroneous operation of the operating unit and thus of the control arrangement are substantially excluded.

BRIEF DESCRIPTION OF THE DRAWING

With the above and other objects and advantages in view, the present invention will become more clearly understood in connection with the detailed description of a preferred embodiment, when considered with the accompanying drawing, of which the only figure is the block diagram of the arrangement.

DETAILED DESCRIPTION OF THE PREFERRED EMBODIMENT

On a line 1 there is a speed actual-value signal which can be derived, for instance, from a reed contactor or an alternating current generator. The line is connected with a comparison point 2 of a regulator. Another line 3 on which the speed desired-value signal is present leads to the comparison point. This line 3 is an output of a first storage 4 which is arranged in a stack together with a second storage 5. The storages 4 and 5 are controlled by a control arrangement 6 via control lines 7 and 8. By the dashed line 9 there is indicated an input line to the first storage 4 by which line the speed signal present at a given time on the line 1 can be entered as speed desired-value signal in the first storage.

The comparison point 2 lies at the input of a regulator amplifier 10 which can be provided in customary manner with time elements (not shown) for setting the desired time response of the regulator. To the output of the regulator amplifier 10 there is connected, via a further comparison point 11, a power amplifier 12 which feeds an electric setting device 13 for the displacement of a throttle valve or an injection system. A return line extends from a position reporter 14 to the further comparison point 11 in conventional manner in order to effect a linearizing of the setting behavior.

The control arrangement 6 for the first and second storage stacks can be acted on by the driver by means of an operating device 16. The operating device comprises contacts which can be actuated by buttons or similar actuating elements, specifically: A contact actuatable by an off button 17, a contact actuatable by a restart button 18, a contact which is actuatable by a button 19 for accelerating and setting and finally a contact which can be switched by a button 20 for braking and setting. Furthermore, the control arrangement is connected with a brake-light contact 21 which is thus connected by actuation of the vehicle brake. Finally, the so-called terminal 15 of the automotive vehicle which terminal is under voltage after the turning on of the ignition is coupled via a resistor 22 and a capacitor 23 to the control arrangement. In this connection a zener diode 24 serves for pulse and voltage limitation.

Let us assume that, initially, both storages 4 and 5 are erased. After connection of the ignition, a voltage pulse passes via the capacitor 23 into the control arrangement 6 which so controls the storages 4 and 5 that the first speed desired-value signal is stored in both storages. This can take place in the manner that the button 19 is actuated, as a result of which the vehicle is accelerated to the desired actual speed, for instance the cruising speed. The button 19 is then released whereby the control arrangement 6 produces a command by which the speed signal on the line 9 is fed as speed desired-value signal into both storages 4 and 5. The speed of the vehicle is then automatically regulated in customary manner by formation of the difference between the speed desired-value signal on the line and the speed actual-value signal on the line 1 and further processing of the signal which leads to an adjustment of the electric setting device 13 in such a manner that the influence on the speed of the vehicle of disturbing variables such as hills, opposing wind, and variations in load are cancelled out. This regulation can be disconnected intentionally by actuating the button 17 or by braking - contact 21. In order to again connect the regulation with the first speed desired value the restart-button 18 is actuated.

If during the course of the trip the vehicle is to be braked along any section and continue with lower speed, the button 20 is merely actuated, as a result of which the vehicle is braked until the button is released. By the release of the button 20 the speed actual-value signal which has been reached at that time is immediately now placed as speed desired-value signal via the input line 9 in the first storage 4. In this connection, the first speed desired-value signal moves into the second storage 5. For example, the first storage 4 and the second storage 5 may be formed in a well known manner by shift registers (not shown) wherein, upon a strobing of the registers by signals from the control arrangement 6, the signals stored in a register of the first storage 4 passes into a register of the second storage 5. The vehicle now travels with the speed regulated to a lower value corresponding to the second speed desired-value. If at the end of the section which had to be traveled through with reduced speed, acceleration is again to be effected to cruising speed, the driver merely actuates the restart button 18. In this way, the first speed desired-value signal again slides within this stack into the first storage 4 so that the first speed desired-value signal establishes the speed of the vehicle equal to the cruising speed. Simultaneously with the actuation of the restart button 18, the first speed desired value is reduplicated, it thus remaining also in the second storage and being available for the regulation upon reactuation of the restart button.

If in the process described above, during which the vehicle travels with a reduced regulated speed equal to the second speed desired-value signal, the regulation is first of all disconnected and then connected again by actuating the restart button 18, the content of the storage in the stack remains unchanged so that the regulation is effected by the second speed desired-value signal in the storage 4. When the restart button is again actuated the storage contents of the first and second storages 4 and 5 in the stack also remain unchanged unless the speed actual-value signal has previously reached the speed desired-value signal. This condition is indicated by a line 25, also shown as a dashed line, leading to the control arrangement. Only after the speed of the vehicle corresponds to the speed predetermined in accordance with the second speed desired-value signal, can the first speed desired-value signal be pushed into the first storage by again actuating the restart button 18 and thus become active for the regulating of the cruising speed.

It is furthermore pointed out that all elements shown in the drawing, with the exception of the setting device 13, the position reporter 14, the return line 15a, the terminal 15, the operating device 16 with corresponding buttons and contacts and the brake-light contact 21, are referred to together as regulator.

I claim:

1. In a device for regulating the speed of a vehicle and particularly of an automotive vehicle having an electronic regulator; and wherein said regulator comprises a first storage for storing a speed desired-value signal and a control system for operating the storage; said regulator including means for comparing a speed actual-value signal with the speed desired-value signal to produce a corresponding setting signal; and said control system having an operating device which is connected to the regulator and has at least one button for setting the storage to the speed desired-value signal, one button for disconnecting regulation of the regulator, the improvement comprising means in the regulator including a second storage for storing a second speed desired-value signal, said second storage being connected with the first storage in a stack which is controllable by the control system, and wherein said control system includes switching means providing that in each case, upon each actuation of the setting button, an existing speed signal can be stored in the first storage to serve as the speed desired-value signal after a previous value of speed desired-value signal which may have been previously stored in the first storage has been transferred into the second storage.

2. The device according to claim 1 wherein
said control system and said switching means provide that upon each actuation of the restart button, the speed desired-value signal contained in the second storage can be duplicated by transfer into the first storage for the regulation.

3. In a device for regulating the speed of a vehicle and particularly of an automotive vehicle having an electronic regulator; and wherein said regulator comprises a first storage for storing a speed desired-value signal and a control system for operating the storage; said regulator including means for comparing a speed actual-value signal with the speed desired-value signal to produce a corresponding setting signal; and said control system having an operating device which is connected to the regulator and has at least one button for setting the storage to the speed desired-value signal, one button for disconnecting regulation of the regulator, the improvement comprising means in the regulator including a second storage for storing a second speed desired-value signal, said second storage being connected with the first storage in a stack which is controllable by the control system, and means for storing the same present speed desired-value signal in the first storage and in the second storage upon the first actuation of the setting button after energization of the ignition.

4. The device according to claim 1, wherein
said operating device includes an off switch button, and wherein
the control system provides that, actuation of the off switch button and upon actuation of the restart button, the speed desired-value signal last present in the first storage is utilized in the regulation and no speed desired-value signal can be transferred between the first storage and the second storage.

* * * * *